(12) United States Patent
Jung et al.

(10) Patent No.: US 9,576,547 B2
(45) Date of Patent: Feb. 21, 2017

(54) DISPLAY PANEL WITH ALTERNATING SUB-PIXEL ELECTRODES

(71) Applicant: SAMSUNG DISPLAY CO., LTD., Yongin, Gyeonggi-Do (KR)

(72) Inventors: Kwang-Chul Jung, Seongnam-si (KR); Chong-Chul Chai, Seoul (KR); Mee-Hye Jung, Suwon-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 5 days.

(21) Appl. No.: 14/538,589

(22) Filed: Nov. 11, 2014

(65) Prior Publication Data
US 2015/0061987 A1    Mar. 5, 2015

Related U.S. Application Data

(62) Division of application No. 12/578,692, filed on Oct. 14, 2009, now Pat. No. 8,922,469.

(30) Foreign Application Priority Data

Dec. 24, 2008   (KR) .................. 10-2008-0133715

(51) Int. Cl.
G09G 5/02      (2006.01)
G09G 3/36      (2006.01)
(Continued)

(52) U.S. Cl.
CPC ......... *G09G 3/3696* (2013.01); *G02F 1/13624* (2013.01); *G02F 1/134363* (2013.01); *G09G 3/3648* (2013.01); *G09G 3/3659* (2013.01); *G02F 2001/134345* (2013.01); *G02F 2201/124* (2013.01); *G09G 2300/0434* (2013.01); *G09G 2300/0814* (2013.01);
(Continued)

(58) Field of Classification Search
CPC ............... G09G 3/3659; G09G 2300/0434; G09G 2320/0219; G09G 3/3696; G09G 3/3648; G02F 1/13624; G02F 1/134363
USPC .................................. 345/87, 695
See application file for complete search history.

(56) References Cited

U.S. PATENT DOCUMENTS 7,486,362 B2    2/2009   Park
7,545,470 B2    6/2009   Park et al.
(Continued)

FOREIGN PATENT DOCUMENTS

CN        1983374      6/2007
CN        101109880    1/2008
(Continued)

OTHER PUBLICATIONS

Korean Office Action Dated Oct. 31, 2014.
Chinese Office Action Dated Jun. 3, 2015.
Korean Office Action Dated Jul. 28, 2015.

*Primary Examiner* — Adam J Snyder
(74) *Attorney, Agent, or Firm* — F. Chau & Associates, LLC

(57) ABSTRACT

A display panel includes a first sub-pixel electrode and a second sub-pixel electrode alternating with each other to form a horizontal electric field, a first data line transmitting a first data voltage to the first sub-pixel electrode, and a second data line transmitting a second data voltage to the second sub-pixel electrode, wherein the second sub-pixel electrode is formed to overlap the first and second data lines.

10 Claims, 10 Drawing Sheets

(51) Int. Cl.
*G02F 1/1362* (2006.01)
*G02F 1/1343* (2006.01)

(52) U.S. Cl.
CPC ............. *G09G 2300/0852* (2013.01); *G09G 2300/0876* (2013.01); *G09G 2320/0219* (2013.01)

(56) References Cited

U.S. PATENT DOCUMENTS

| | | | |
|---|---|---|---|
| 2002/0063835 A1 | 5/2002 | Kim | |
| 2002/0176030 A1* | 11/2002 | Matsumoto | G02F 1/1345 349/43 |
| 2003/0052847 A1* | 3/2003 | Okishiro | G09G 3/3659 345/87 |
| 2003/0090448 A1* | 5/2003 | Tsumura | G09G 3/3648 345/87 |
| 2003/0189563 A1* | 10/2003 | Sato | G09G 3/3659 345/209 |
| 2005/0046763 A1* | 3/2005 | Ono | G02F 1/134363 349/39 |
| 2006/0001815 A1 | 1/2006 | Kim et al. | |
| 2006/0146248 A1* | 7/2006 | Park | G09G 3/3659 349/141 |
| 2006/0227273 A1* | 10/2006 | Shin | G02F 1/13624 349/139 |
| 2007/0080370 A1* | 4/2007 | Miyachi | G09G 3/3659 257/107 |
| 2007/0229745 A1* | 10/2007 | Do | G09G 3/3648 349/129 |
| 2007/0262938 A1* | 11/2007 | Kim | G09G 3/3688 345/92 |
| 2008/0079679 A1* | 4/2008 | Ozawa | G09G 3/3659 345/89 |
| 2008/0136992 A1* | 6/2008 | Kim | G02F 1/133514 349/48 |
| 2008/0204613 A1* | 8/2008 | Kim | G02F 1/133707 349/139 |
| 2008/0284719 A1 | 11/2008 | Yoshida | |
| 2008/0284929 A1* | 11/2008 | Kimura | 349/38 |

FOREIGN PATENT DOCUMENTS

| | | | |
|---|---|---|---|
| JP | H10301150 | 11/1998 | |
| JP | 2001033799 | 2/2001 | |
| JP | 2003057673 | 2/2003 | |
| JP | 2005-077424 | 3/2005 | |
| JP | 2005-300780 | 10/2005 | |
| KR | 10-2002-0077008 | 10/2002 | |
| KR | 10-2005-0068258 | * 7/2005 | ........... G02F 1/1343 |
| KR | 20070072131 | 7/2007 | |
| KR | 10-2008-0047788 | 5/2008 | |

* cited by examiner

DISPLAY PANEL WITH ALTERNATING SUB-PIXEL ELECTRODES

CROSS-REFERENCE TO RELATED APPLICATIONS

This application is a divisional of, and claims priority from, U.S. application Ser. No. 12/578,692, filed on Oct. 14, 2009 in the U.S. Patent and Trademark Office, which in turn claims priority from Korean Patent Application No. 10-2008-0133715 filed on Dec. 24, 2008 in the Korean Intellectual Property Office, the contents of which are herein incorporated by reference in their entirety.

BACKGROUND OF THE INVENTION

1. Field of the Invention

The present disclosure is directed to a display panel, and more particularly, to a display panel having a horizontal electric field formed between first and second sub-pixel electrodes.

2. Description of the Related Art

A display panel of a liquid crystal display (LCD) displays images using a plurality of unit pixels each including a thin film transistor (TFT) and a liquid crystal capacitor.

The liquid crystal capacitor includes pixel electrodes, a common electrode, and a liquid crystal layer interposed between the pixel electrodes and the common electrode. The display panel provides the pixel electrode with external charges through the TFT to change an electric field formed between the pixel electrodes and the common electrode. The change in the electric field formed between the pixel electrodes and the common electrode changes the orientation of the liquid crystal molecules, which changes the light transmittance of liquid crystal molecules, to thereby display an image.

SUMMARY OF THE INVENTION

Embodiments of the present invention provide a display panel having improved image quality.

The above and other objects of embodiments of the present invention will be described in or be apparent from the following description of exemplary embodiments.

According to an aspect of the present invention, there is provided a display panel including a first sub-pixel electrode and a second sub-pixel electrode alternating with each other to form a horizontal electric field, a first data line transmitting a first data voltage to the first sub-pixel electrode, and a second data line transmitting a second data voltage to the second sub-pixel electrode, wherein the second sub-pixel electrode is formed to overlap the first and second data lines.

According to another aspect of the present invention, there is provided a display panel including a plurality of gate lines formed on a substrate, a plurality of first data lines formed to cross the plurality of gate lines and transmitting a first data voltage, a plurality of second data lines formed to be parallel with the plurality of first data lines and transmitting a second data voltage, and a plurality of pixels defined by the plurality of gate lines and the plurality of first data lines, each of the plurality of pixels including first and second sub-pixel electrodes alternating with each other to form a horizontal electric field, wherein the second sub-pixel electrode is formed along the first and second data lines and the gate line of a previous stage.

According to still another aspect of the present invention, there is provided a display panel including a gate line transmitting a gate voltage, first and second sub-pixel electrodes alternating with each other to form a horizontal electric field, a first switching device selectively connecting the first sub-pixel electrode and a first data line according to the gate voltage, a second switching device selectively connecting the second sub-pixel electrode and a second data line according to the gate voltage, and a liquid crystal capacitor formed between the first and second sub-pixel electrodes, wherein when the first and second switching devices are turned off and polarities of first and second data voltages applied to the first and second data lines are changed, there is no voltage variation between the first and second sub-pixel electrodes.

DETAILED DESCRIPTION OF EXEMPLARY EMBODIMENTS

Figure 1:
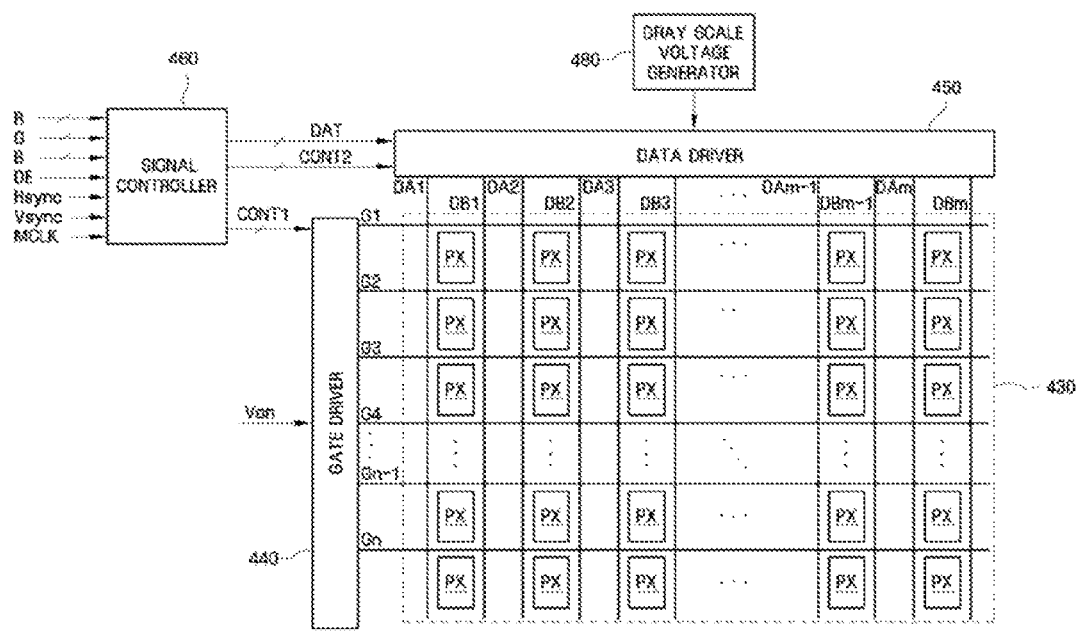
FIG. 1 is a block diagram illustrating a display device according to an embodiment of the present invention.

Features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Like reference numerals refer to like elements throughout the specification. It will be understood that when an element or layer is referred to as being "on," "connected to" or "coupled to" another element or layer, it can be directly on, connected or coupled to the other element or layer or intervening elements or layers may be present.

Exemplary embodiments of the invention are described more fully hereinafter with reference to a liquid crystal display (LCD). However, it will be understood that the present invention is not limited to these embodiments and may be applied to flat panel displays including an organic light emitting diode display (OLED), and a plasma display panel (PDP).

FIG. 1 is a block diagram illustrating a display device according to an embodiment of the present invention.

Referring to FIG. 1, a display device according to an embodiment of the present invention includes a display panel 430, a gate driver 440 and a data driver 450 connected to the display panel 430, a gray scale voltage generator 480 connected to the data driver 450, and a signal controller 460 controlling these functional components.

In view of an equivalent circuit, the display panel 430 includes a plurality of pixels PX which are connected to a plurality of display signal lines and are arranged in a matrix. Here, the display panel 430 includes a lower display panel and an upper display panel which face each other, and a liquid crystal layer interposed between the lower display panel and the upper display panel.

The plurality of display signal lines are disposed on the lower display panel, and include a plurality of gate lines G1-Gn transmitting gate signals and a plurality of first data lines DA1-DAm and second data lines DB1-DBm transmitting data signals. The gate lines G1-Gn extend substantially in a row direction and are substantially in parallel with one another. The first data lines DA1-DAm and the second data lines DB1-DBm extend substantially to cross the gate lines G1-Gn and are alternately arranged to be substantially in parallel with each other.

The respective pixels PX include switching devices connected to corresponding gate lines G1-Gn and first and second data lines DA1-DAm and DB1-DBm, and liquid crystal capacitors connected to the switching devices. If necessary, storage capacitors may be connected to the switching devices parallel with the liquid crystal capacitors.

A switching device includes a thin film transistor (TFT) and is a three-terminal element having a control terminal connected to a corresponding one of the gate lines G1-Gn, an input terminal connected to a corresponding one of the first data lines DA1-DAm or the second data lines DB1-DBm, and an output terminal connected to the liquid crystal capacitor.

The gate driver 440 is connected to the gate lines G1-Gn and applies gate signals comprised of a combination of a high-level gate signal (a gate-on voltage Von) and a low-level gate signal (a gate-off voltage Voff (not shown)), which are received from an external source (not shown), to the gate lines G1-Gn. The gate driver 440 illustrated in FIG. 1 is located at one side of the display panel 430 and is connected to all of the gate lines G1-Gn. While the gate driver 440 located at one side of the display panel 430 has been described, the invention is not limited thereto and a pair of gate driving units may be located at left and right sides of the display panel 430, respectively, to be simultaneously connected to the respective gate lines G1-Gn. For example, in a case where a large-sized LCD includes only a single gate driver, satisfactorily transmitting the gate-on voltage Von or the gate-off voltage Voff to the gate lines G1-Gn may not be ensured. Thus, a pair of gate drivers may be connected to both sides of the gate lines G1-Gn. The gate driver 440 may also be incorporated in the form of an integrated circuit having at least one TFT and disposed on the lower display panel of the display panel 430.

The gray scale voltage generator 480 generates gray scale voltages related to the transmittance of the pixels.

The data driver 450 is connected to the first and second data lines DA1-DAm, DB1-DBm of the display panel 430, and applies the gray scale voltages, i.e., data voltages, generated from the gray scale voltage generator 480, to the pixels. Here, if the gray scale voltage generator 480 is designed to provide only a reference gray scale voltage, instead of providing voltages for all gray scales, the data driver 450 generates a plurality of reference voltages for all gray scales by dividing the reference gray scale and selecting one of the reference voltages as a data voltage.

The gate driver 440 or the data driver 450 may be integrated into the display panel 430 along with the display signal lines G1-Gn, DA1-DAm and DB1-DBm and the TFTs. In alternative exemplary embodiments, the gate driver 440 or the data driver 450 may be directly mounted on the liquid display panel 430 as a tape carrier package ("TCP") by being mounted on a flexible printed circuit film (not shown).

The signal controller 460 controls operations of the gate driver 440 and the data driver 450.

The signal controller 460 receives input image signals R, G and B from an external graphic controller (not shown) and input control signals which control display of the input image signals R, G and B. The input control signals may include, for example, a vertical synchronization signal Vsync, a horizontal synchronization signal Hsync, a main clock signal MCLK and a data enable signal DE. The signal controller 460 appropriately processes the input image signals R, G and B adaptive to operating conditions of the display panel 430 on the basis of the input control signals, generates a gate control signal CONT1, a data control signal CONT2 and a processed image data signal DAT, provides the gate control signal CONT1 to the gate driver 440 and provides the data control signal CONT2 and the processed image data signal DAT to the data driver 450.

The gate control signal CONT1 includes a scanning initiation signal STV (not shown) to initiate scanning of the gate driver 440 and at least one clock signal to control when to output the gate-on voltage Von. The gate control signal CONT1 may also include an output enable signal OE (not shown) to define the duration of the gate-on voltage Von. Here, the clock signal included in the gate control signal CONT1 may be used as a selection signal SE (not shown).

The data control signal CONT2 includes a horizontal synchronization start signal STH (not shown) to inform the data driver 500 of a start of data transmission for a group of pixels, a load signal LOAD (not shown) to instruct the data driver 500 to apply the data voltages to the data lines D1-Dm, and a data clock signal HCLK (not shown). The data control signal CONT2 may also include an inversion signal RVS (not shown) to reverse the polarity of the data voltage with respect to a ground voltage, which is briefly referred to as "polarity of data voltage".

In response to the data control signal CONT2 transmitted from the signal controller 460, the data driver 450 receives image data DAT for the pixels PX, selects from the gray scale voltage generator 480 a gray scale voltage for the image data DAT, converts the image data DAT into a corresponding data voltage, and applies the data voltage to one of the first and second data lines DA1-DAm and DB1-DBm corresponding to the pixels PX.

In response to the gate control signal CONT1 transmitted from the signal controller 460, the gate driver 440 applies the gate-on voltage Von to one of the gate lines G1-Gn, so that the switching device connected to the gate line to which the gate-on voltage Von is applied is turned on. Accordingly, the data voltage applied to the first and second data lines DA1-DAm and DB1-DBm via the data line is applied to the pixel PX via the switching device.

A data voltage applied to each pixel PX is represented as a voltage charged across a liquid crystal capacitor, which is referred to as a pixel voltage. The orientations of liquid crystal molecules in the liquid crystal layer depend on the magnitude of the pixel voltage, and molecular orientations of the liquid crystal molecules determine the polarization of light passing through the liquid crystal layer, resulting in the transmission of light.

Hereinafter, a display panel according to an embodiment of the present invention will be described in more detail with reference to FIGS. 2 and 3.

Figure 2:
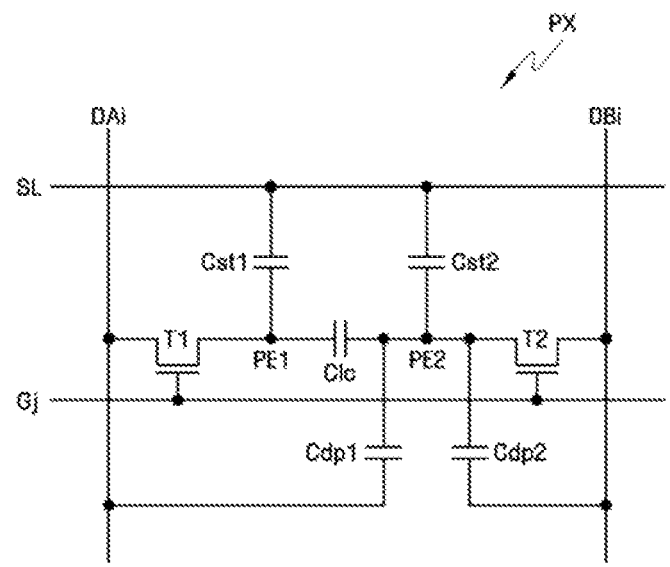
FIG. 2 illustrates an equivalent circuit diagram of an exemplary pixel of a display panel illustrated in FIG. 1.
Figure 3:
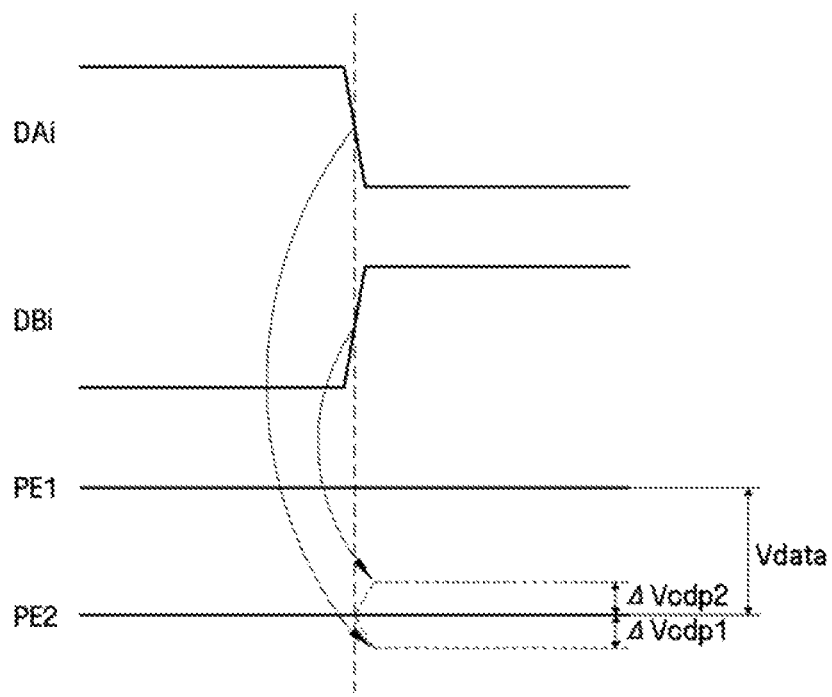
FIG. 3 illustrates a voltage variation between first and second sub-pixel electrodes depending on polarities of data voltages applied to first and second data lines.

FIG. 2 illustrates an equivalent circuit diagram of an exemplary pixel of a display panel illustrated in FIG. 1, and FIG. 3 illustrates a voltage variation between first and second sub-pixel electrodes depending on polarities of data voltages applied to first and second data lines.

Referring to FIGS. 2 and 3, the display panel (430 of FIG. 1) includes a gate line Gj transmitting a gate voltage, and first and second data lines DAi and DBi formed to cross the gate line Gj and transmitting a data voltage. A pixel PX defined by the gate line Gj and the first and second data lines DAi and DBi includes first and second sub-pixel electrodes PE1 and PE2 alternating with each other and forming a horizontal electric field.

In detail, the pixel PX includes first and second switching devices T1 and T2, the first and second sub-pixel electrodes PE1 and PE2, a liquid crystal capacitor Clc, and first and second storage capacitors Cst1 and Cst2. As both terminals of the liquid crystal capacitor Clc are supplied with the data voltage through first and second switching devices T1 and T2, the liquid crystal capacitor Clc is charged with the pixel voltage.

In detail, the first switching device T1 is formed at an intersection of the gate line Gj and the first data line DAi, and the second switching device T2 is formed at an intersection of the gate line Gj and second data line DBi. Here, the first switching device T1 and the second switching device T2 may be TFTs.

The first switching device T1 has a control terminal connected to the gate line Gj, an input terminal connected to the first data line DAi, and an output terminal connected to one side of the liquid crystal capacitor Clc. In addition, the output terminal of the first switching device T1 is connected to the first sub-pixel electrode PE1. A first storage capacitor Cst1 is formed between the output terminal of the first switching device T1 and a storage line SL.

Similarly, the second switching device T2 has a control terminal connected to the gate line Gj, an input terminal connected to the second data line DBi, and an output terminal connected to the other side of the liquid crystal capacitor Clc. In addition, the output terminal of the second switching device T2 is connected to the second sub-pixel electrode PE2. A second storage capacitor Cst2 is formed between the output terminal of the second switching device T2 and the storage line SL. Here, the liquid crystal material contained in the liquid crystal layer serves as a dielectric material of the liquid crystal capacitor Clc. The first storage capacitor Cst1 includes the output terminal of the first switching device T1, that is, the first sub-pixel electrode PE1, a storage line SL disposed on the lower display panel, and a dielectric material interposed between the first sub-pixel electrode PE1 and the storage line SL. The second storage capacitor Cst2 includes the output terminal of the second switching device T2, that is, the second sub-pixel electrode PE2, a storage line SL disposed on the lower display panel, and a dielectric material interposed between the second sub-pixel electrode PE2 and the storage line SL.

In particular, in a display panel according to an embodiment of the present invention, a first parasitic capacitor Cdp1 is disposed between the first data line DAi and the second sub-pixel electrode PE2, while no parasitic capacitor exists between the first data line DAi and the first sub-pixel electrode PE1, or such capacitance, if any, is negligible. In addition, a second parasitic capacitor Cdp2 is disposed between the second data line DBi and the second sub-pixel electrode PE2, while no parasitic capacitor exists between the second data line DBi and the first sub-pixel electrode PE1, or such capacitance, if any, is negligible.

Here, the first parasitic capacitor Cdp1 includes the second sub-pixel electrode PE2, the first data line DAi and a dielectric material interposed therebetween, and the second parasitic capacitor Cdp2 includes the second sub-pixel electrode PE2, the second data line DBi and a dielectric material interposed therebetween.

If the voltage applied to the first data line DAi varies, that is, if the first and second switching devices T1 and T2 are turned off and the polarity of a first data voltage applied to the first data line DAi is changed, the first parasitic capacitor can change the data voltage (or a quantity of charges) charged in the second sub-pixel electrode PE2 due to a coupling phenomenon. For example, if the first data voltage applied to the first data line DAi is changed from positive polarity to negative polarity, the data voltage charged in the second sub-pixel electrode PE2 may be reduced. If the first data voltage applied to the first data line DAi is changed from negative polarity to positive polarity, the data voltage charged in the second sub-pixel electrode PE2 may be increased.

Assuming that $\Delta V1$ denotes a variation of the first data voltage applied to the first data line DAi, Cdp1 denotes capacitance of the first parasitic capacitor, and Ccst1 denotes capacitance of the first storage capacitor Cst1, a voltage variation $\Delta Vcdp1$ in the second sub-pixel electrode PE2 based on the first data line DAi can be expressed in the following equation (1):

$$\Delta Vcdp1 = \Delta V1 \frac{Ccdp1}{Ccdp1 + Ccst1} \quad (1)$$

If the voltage applied to the second data line DBi varies, that is, if the first and second switching devices T1 and T2 are turned off and the polarity of a first data voltage applied to the first data line DBi is changed, the second parasitic capacitor can change the data voltage charged in the second sub-pixel electrode PE2 due to a coupling phenomenon. For example, if the second data voltage applied to the second data line DBi is changed from negative polarity to positive polarity, the data voltage charged in the second sub-pixel electrode PE2 may be increased. If the second data voltage applied to the second data line DBi is changed from positive polarity to negative polarity, the data voltage charged in the second sub-pixel electrode PE2 may be reduced.

Assuming that $\Delta V2$ denotes a variation of the second data voltage applied to the second data line DBi, Cdp2 denotes capacitance of the second parasitic capacitor, and Ccst2 denotes capacitance of the second storage capacitor Cst2, a voltage variation $\Delta Vcdp2$ in the second sub-pixel electrode PE2 based on the second data line DBi can be expressed in the following equation (2):

$$\Delta Vcdp2 = \Delta V2 \frac{Ccdp2}{Ccdp2 + Ccst2} \quad (2)$$

Accordingly, as the data voltages applied to the first and second data lines DAi and DBi vary, a voltage variation ΔV of the second sub-pixel electrode PE2 based on the first and second parasitic capacitors Cdp1 and Cdp2 can be rewritten in the following equation (3):

$$\Delta V = \Delta Vcdp1 + \Delta Vcdp2 = \Delta V1 \frac{Ccdp1}{Ccdp1 + Ccst1} + \Delta V2 \frac{Ccdp2}{Ccdp2 + Ccst2} \quad (3)$$

In Equation (3), when capacitances of the first and second storage capacitors Cst1 and Cst2 are uniform, the voltage variation ΔV of the second sub-pixel electrode PE2 may be determined by the first and second parasitic capacitors Cdp1 and Cdp2 and the variations ΔV1 and ΔV2 of the first and second data voltages applied to the first and second data lines DAi and DBi. According to exemplary embodiments of the present invention, the first and second data voltages applied to the first and second data lines DAi and DBi may have different polarities but the same magnitudes. That is to say, the variation ΔV1 in the first data voltage depending on the polarity change of the first data voltage applied to the first data line DAi may be the same with the variation ΔV2 in the second data voltage depending on the polarity change of the second data voltage applied to the second data line DBi. In further exemplary embodiments, the capacitance of the first parasitic capacitor Cdp1 may be substantially the same as that of the second parasitic capacitor Cdp2.

Accordingly, the voltage variation ΔVcdp1 of the second sub-pixel electrode PE2 based on the first parasitic capacitor Cdp1 is substantially the same as the voltage variation ΔVcdp2 of the second sub-pixel electrode PE2 based on the second parasitic capacitor Cdp2 despite having different polarities. Therefore, according to exemplary embodiments of the invention, the data voltage applied to the second sub-pixel electrode PE2 may not substantially change even if the polarities of the first and second data voltages applied to the first and second data lines DAi and DBi are changed.

In further exemplary embodiments of the present invention, since substantially or no parasitic capacitor exists between the first sub-pixel electrode PE1 and each of the first and second data lines DAi and DBi, the data voltage applied to the first sub-pixel electrode PE1 may not substantially change even if the polarities of the first and second data voltages applied to the first and second data lines DAi and DBi are changed.

In addition, since the first and second parasitic capacitors Cdp1 and Cdp2 are disposed between the second sub-pixel electrode PE2 and the first and second data lines DAi and DBi, the voltage variation ΔVcdp1 of the second sub-pixel electrode PE2 based on the first parasitic capacitor Cdp1 is substantially the same with the voltage variation ΔVcdp2 of the second sub-pixel electrode PE2 based on the second parasitic capacitor Cdp2 while having different polarities, as described above. That is to say, the second sub-pixel electrode PE2 may not be substantially affected by the data voltages applied to the first and second data lines DAi and DBi.

Therefore, in a display panel according to an exemplary embodiment of the present invention, even if polarities of data voltages applied to the first and second data lines DAi and DBi are changed, a pixel voltage Vdata charged between the first and second sub-pixel electrodes PE1 and PE2 may not be substantially changed. This will be described in more detail with reference to FIG. 3.

When a gate-on voltage is applied to the gate line Gj, data voltages of +7 V and −7 V may be transmitted from the first and second data lines DAi and DBi to the first and second sub-pixel electrodes PE1 and PE2, respectively. That is to say, a pixel voltage of 14V may be applied between the first and second sub-pixel electrodes PE1 and PE2.

When a gate-off voltage is applied to the gate line Gj, data voltages of +7 V and −7 V may be transmitted from the first and second data lines DAi and DBi to the first and second sub-pixel electrodes PE1 and PE2, respectively. As a column inversion or a dot inversion is performed, the pixel voltage charged between the first and second sub-pixel electrodes PE1 and PE2 may not change. In detail, since there is substantially or no separate parasitic capacitor between the first sub-pixel electrode PE1 and the first and second data lines DAi and DBi, the first sub-pixel electrode PE1 may not be affected by the data voltages applied to the first and second data lines DAi and DBi.

In addition, since the first and second parasitic capacitors Cdp1 and Cdp2 are disposed between the second sub-pixel electrode PE2 and the first and second data lines DAi and DBi, the voltage variation ΔVcdp1 of the second sub-pixel electrode PE2 based on the first parasitic capacitor Cdp1 is substantially the same with the voltage variation ΔVcdp2 of the second sub-pixel electrode PE2 based on the second parasitic capacitor Cdp2 while having different polarities, as described above. That is to say, the second sub-pixel electrode PE2 may not be substantially affected by the data voltages applied to the first and second data lines DAi and DBi.

Therefore, a display panel according to an embodiment of the present invention can realize improved picture quality because the pixel voltage Vdata charged between the first and second sub-pixel electrodes PE1 and PE2 will not be substantially changed after the first and second switching devices T1 and T2 are turned off even if polarities of data voltages applied to the first and second data lines DAi and DBi are changed.

Figure 4:
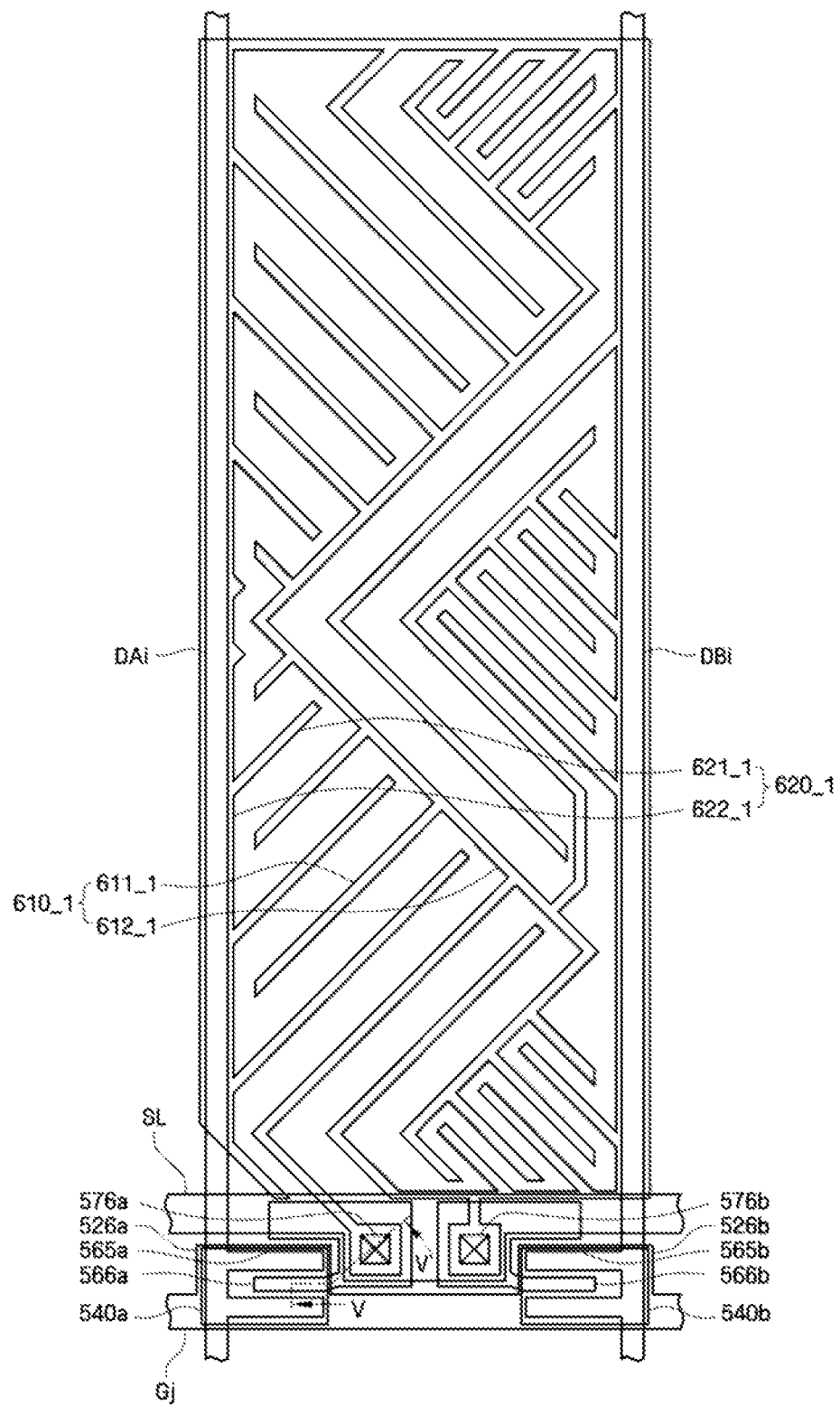
FIG. 4 illustrates a layout view of a display panel including a lower display panel according to an exemplary embodiment of the present invention.
Figure 5:
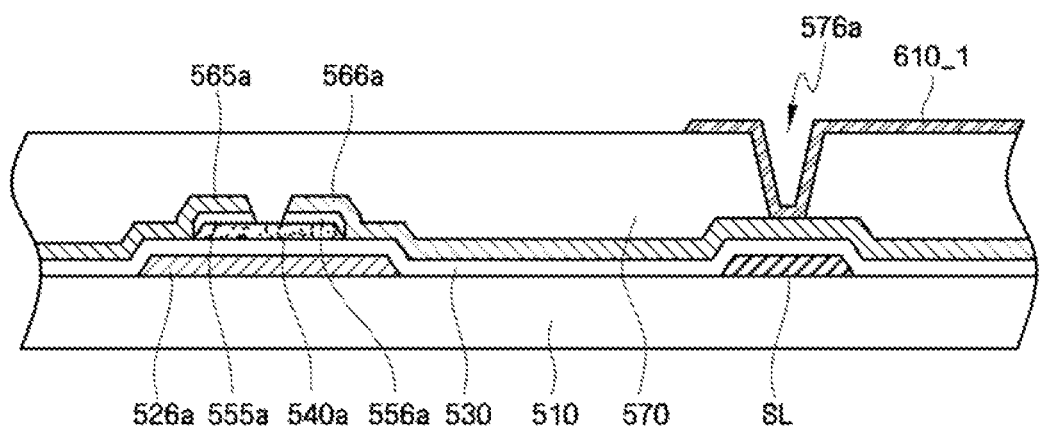
FIG. 5 is a cross-sectional view taken along the line V-V' of FIG. 4.
Figure 6A:
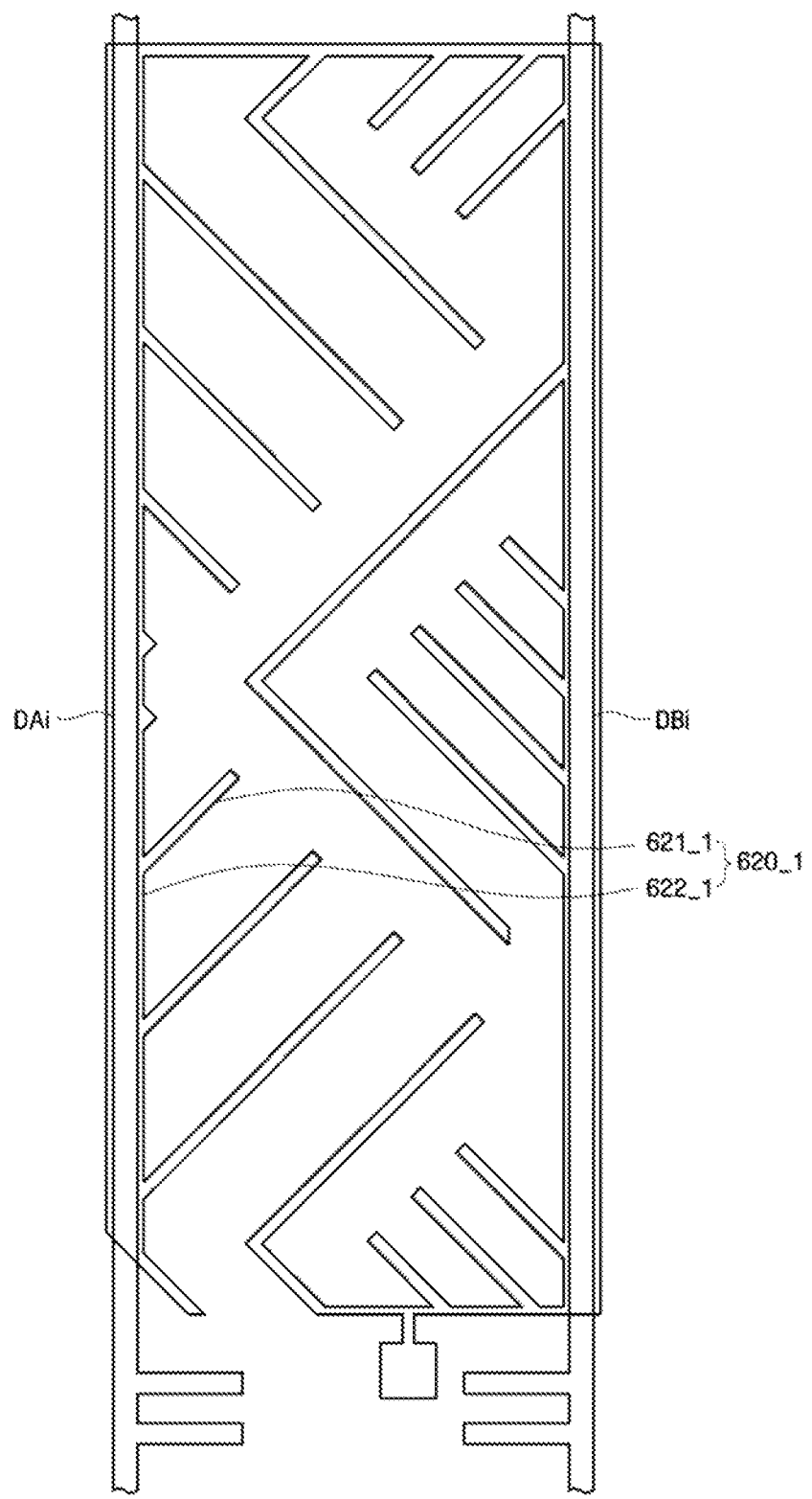
FIG. 6A is a detailed diagram of the display panel illustrated in FIG. 4; illustrating a layout view of the first and second data lines and the first sub-pixel electrode.
Figure 6B:
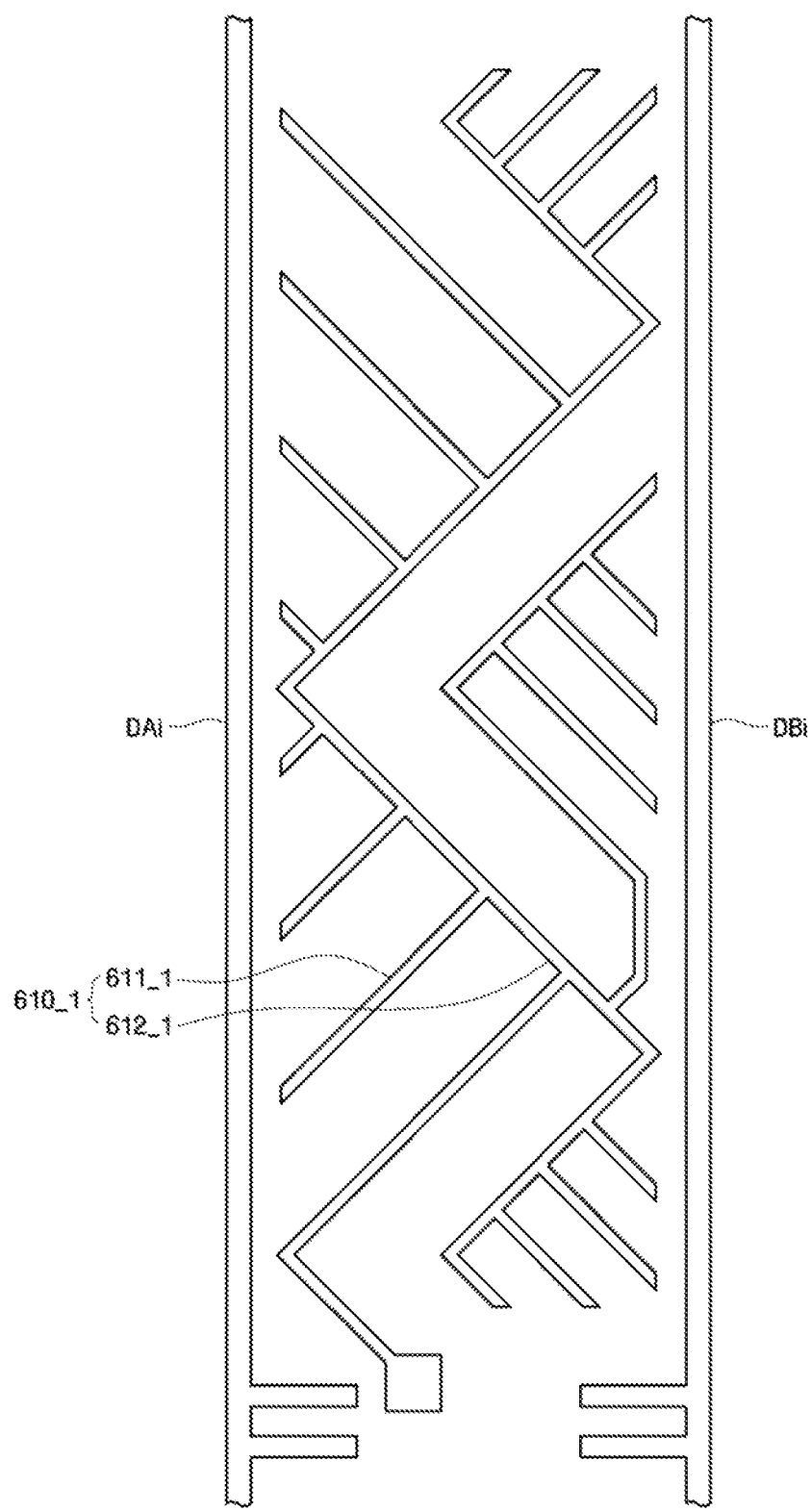
FIG. 6B is a detailed diagram illustrating a layout view of the first and second data lines and the second sub-pixel electrode.
Figure 7:
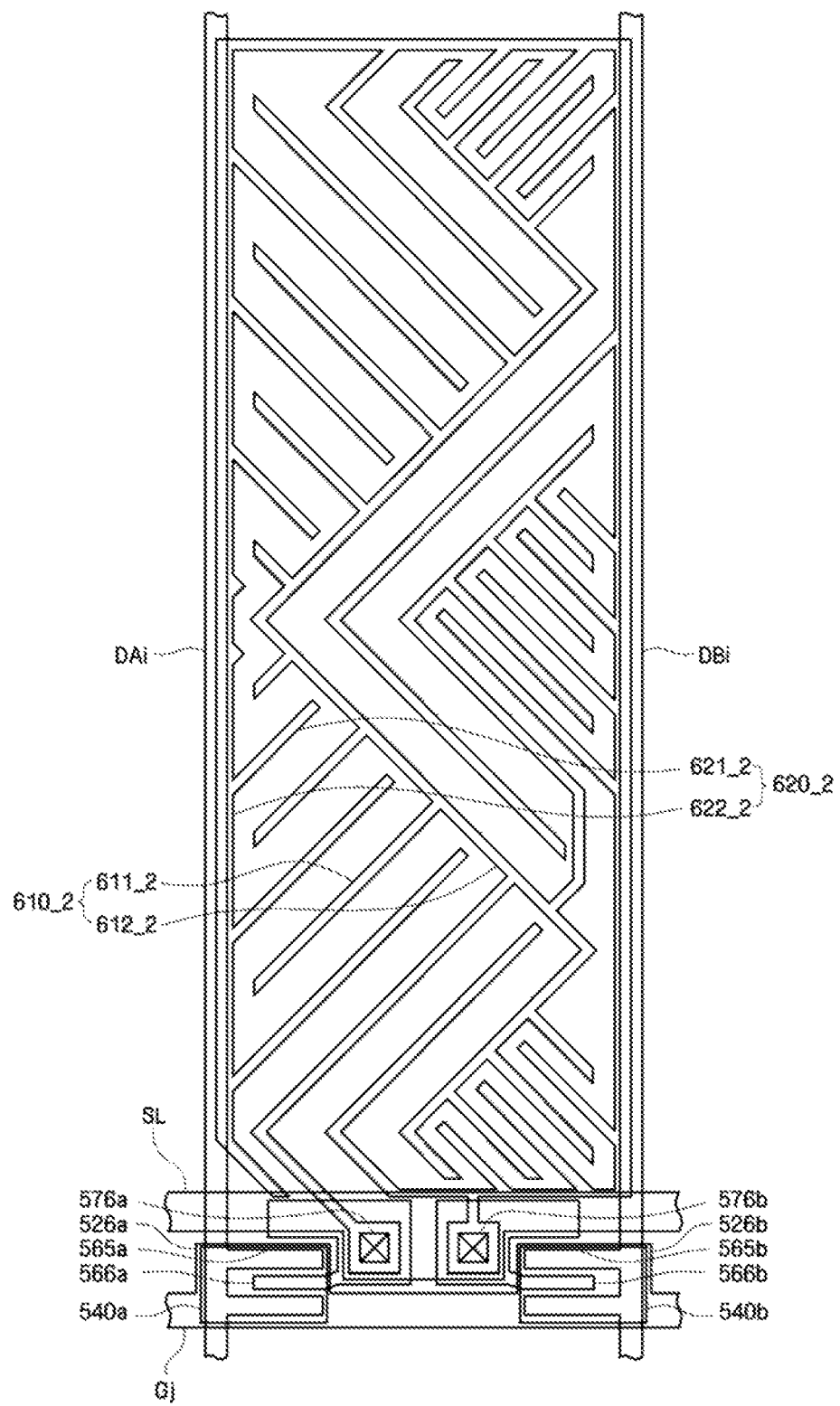
FIG. 7 illustrates a layout view of a modified embodiment of the display panel illustrated in FIG. 4.

Hereinafter, a display panel according to an exemplary embodiment of the present invention will be described with reference to FIGS. 4 through 7. FIG. 4 illustrates a layout view of a display panel including a lower display panel according to an exemplary embodiment of the present invention, FIG. 5 is a cross-sectional view taken along the line V-V' of FIG. 4, FIG. 6A is a detailed diagram of the display panel illustrated in FIG. 4, illustrating a layout view of the first and second data lines and the first sub-pixel electrode, and FIG. 6B is a detailed diagram illustrating a layout view of the first and second data lines and the second sub-pixel electrode. FIG. 7 illustrates a layout view of a modified embodiment of the display panel illustrated in FIG. 4.

A display panel according to this embodiment includes a lower display panel having a thin film transistor (TFT) array, an upper display panel facing the TFT array, and a liquid crystal layer interposed therebetween.

Referring to FIGS. 4 and 5, the lower display panel will first be described. Gate lines Gj extending substantially in a horizontal direction and transmitting gate signals are disposed on an insulation substrate 510 that may include, for example, transparent glass. The gate lines Gj are coupled to each pixel in a one-to-one corresponding relationship. First and second gate electrodes 526a and 526b in forms of protrusions are coupled to the gate line lines Gj. The first gate electrode 526a is formed at an intersection with the first data line DAi, and the second gate electrode 526b is formed at an intersection with the second data line DBi. The gate lines Gj and the first and second gate electrodes 526a and 526b are collectively referred to as gate interconnections.

A storage line SL is disposed on the insulation substrate 10 and extends across a pixel region along a horizontal direction to be substantially parallel to the gate line lines Gj. The storage line SL overlaps first and second sub-pixel electrodes 610_1 and 620_1 to form a storage capacitor, thereby improving the charge retention capability of the pixels. Here, the shape and arrangement of the storage line SL may be altered in various ways.

The gate interconnections and the storage line SL may include aluminum (Al) or an aluminum-based metallic material such as an aluminum alloy, silver (Ag) or a silver-based metallic material such as a silver alloy, copper (Cu) or a copper-based metallic material such as a copper alloy, molybdenum (Mo) or a molybdenum-based metallic material such as a molybdenum alloy, chrome (Cr), titanium (Ti), or tantalum (Ta). In addition, the gate interconnections and the storage line SL may include a multi-layered structure including two conductive layers (not shown) having different physical properties. In an exemplary embodiment of the invention, one of the two conductive layers may include a low-resistivity metal, such as, for example, aluminum or an aluminum-based metallic material, silver or a silver-based metallic material, copper or a copper-based metallic material such that the possibility of a signal delay or a voltage drop can be reduced. In further exemplary embodiments of the invention, the other conductive layer may include a material having good contact characteristics with, for example, indium tin oxide ("ITO") or indium zinc oxide ("IZO"), such as molybdenum or a molybdenum-based metallic material, chromium, titanium, or tantalum. Examples of such combinations of the gate interconnections and the storage line SL may include double layers including a chromium layer as a lower layer and an aluminum layer as an upper layer, or including an aluminum layer as a lower layer and a molybdenum layer as an upper layer. However, embodiments of the present invention are not restricted to this. That is, in other exemplary embodiments of the invention, the gate interconnections and the storage line SL may include various metals and conductive materials other than those set forth herein.

A gate insulation layer 530 on the gate lines Gj and the storage line SL may include silicon nitride (SiNx).

First and second semiconductor layers 540a and 540b made of hydrogenated amorphous silicon or polycrystalline silicon are formed on the gate insulation layer 530. The first semiconductor layer 540a overlaps the first gate electrode 526a, and the second semiconductor layer 540b overlaps the second gate electrode 526b. The first and second semiconductor layers 540a and 540b may have various shapes, such as an island shape or a line shape.

Ohmic contact layer layers 555a and 556a made of silicide or n+ hydrogenated amorphous silicon doped with a high concentration of n-type impurities may be formed on the first and second semiconductor layers 540a and 540b. In an exemplary embodiment of the invention, the ohmic contact layers 555a and 556a are positioned on semiconductor layer 540a as a pair.

First drain electrodes 566a corresponding to the first data lines DAi and second drain electrodes 566b corresponding to the second data lines DBi are formed on the ohmic contact layers 555a and 556a and on the gate insulation layer 530.

The first and second data lines DAi and DBi extend in a longitudinal direction and cross the gate lines Gj and the storage line SL and transmit data voltages. First source electrodes 565a respectively extending toward the first drain electrodes 566a are formed at the first data lines DAi. Second source electrodes 565b respectively extending toward the second drain electrodes 566b are formed at the second data lines DBi. As shown in FIG. 4, if a pixel includes the first and second sub-pixel electrodes 610_1 and 620_1, the first and second data lines DAi and DBi transmit data voltages having different polarities to the first and second sub-pixel electrodes 610_1 and 620_1. In detail, the first and second data lines DAi and DBi may transmit data voltages having different polarities while having the same magnitudes to the first and second sub-pixel electrodes 610_1 and 620_1.

The first and second data lines DAi and DBi, the first and second source electrodes 565a and 565b, the first and second drain electrodes 566a and 566b are collectively referred to as data interconnections.

The data interconnections may include a refractory metal such as chromium, molybdenum or a molybdenum-based metallic material, tantalum, or titanium. In further exemplary embodiments of the invention, the data interconnections may have a multi-layered structure including a lower layer (not shown) that includes a refractory metal and an upper layer (not shown) that includes a low-resistivity material. Examples of the multi-layered structure include a double-layered structure having an upper Cr film and a lower Al film or a lower Al film and an upper Mo film, and a triple-layered structure having a lower Mo film, an intermediate Al film, and an upper Mo film.

The first and second source electrodes 565a and 565b at least partially overlap the first and second semiconductor layers 540a and 540b. The first and second drain electrodes 566a and 566b are opposite to and face the first and second source electrodes 565a and 565b with respect to the gate electrodes 526a and 526b and at least partially overlap the first and second semiconductor layers 540a and 540b. Here, the ohmic contact layers 555a and 556a are interposed between the underlying first and second semiconductor layers 540a and 540b and the overlying first and second source electrodes 565a and 565b, and between the underlying first and second semiconductor layers 540a and 540b and the overlying first and second drain electrodes 566a and 566b to reduce the contact resistance between them.

A passivation layer 570 is formed on the data interconnections, and exposed portions of the first and second semiconductor layers 540a and 540b. The passivation layer 570 may include a silicon nitride- or silicon-oxide-based inorganic material, a photosensitive organic material with good planarization properties, or a low-k dielectric material such as a-Si:C:O or a-Si:O:F that may be formed using a plasma enhanced chemical vapor deposition ("PECVD") method. The passivation layer 570 may also have a double-layered structure including a lower film of an inorganic insulator and an upper film of an organic insulator to have the good insulating characteristics of the organic insulator while preventing the exposed portions of the first and second semiconductor layers 540a and 540b from being damaged by the organic insulator. In other exemplary embodiments of the invention, a red, green, or blue color filter layer may be used as the passivation layer 570.

First and second sub-pixel electrodes 610_1 and 620_1 are formed on the passivation layer 570. The first and second sub-pixel electrodes 610_1 and 620_1 are respectively electrically connected to the first and second drain electrodes 566a and 566b via first and second contact holes 576a and 576b. In other exemplary embodiments of the invention, the first and second sub-pixel electrodes 610_1 and 620_1 may be formed of a transparent conductive material such as ITO or IZO or may be formed of a reflective conductive material such as aluminum.

The first and second sub-pixel electrodes 610_1 and 620_1 may constitute a pixel electrode for each pixel.

Referring to FIGS. 2 and 4, the liquid crystal capacitor Clc has the first sub-pixel electrode 610_1 and the second sub-pixel electrode 620_1 as both terminals. To uniformly maintain charge retention capability of the capacitor Clc after the first and second switching devices T1 and T2 are turned off, first and second storage capacitors Cst1 and Cst2 may be formed. Here, the first storage capacitor Cst1 may be formed by laying the storage line SL over the first sub-pixel electrode 610_1 or the first drain electrode 566a connected to the first sub-pixel electrode 610_1. The second storage capacitor Cst2 may be formed by laying the storage line SL over the second sub-pixel electrode 620_1 or the second drain electrode 566b connected to the second sub-pixel electrode 620_1.

The first and second sub-pixel electrodes 610_1 and 620_1 are physically and electrically connected to the first and second drain electrodes 566a and 566b via first and second contact holes 576a and 576b to receive data voltages from the first and second drain electrodes 566a and 566b. A first data voltage supplied from the first data line DAi is applied to the first sub-pixel electrode 610_1, and a second data voltage supplied from the second data line DBi is applied to the second sub-pixel electrode 620_1.

A horizontal electric field is generated between the first sub-pixel electrode 610_1 to which the first data voltage is applied and the second sub-pixel electrode 620_1 to which the second data voltage is applied, to determine the orientations of the liquid crystal molecules positioned over the first and second sub-pixel electrodes 610_1 and 620_1. The first sub-pixel electrode 610_1 includes first stripes 611_1 extending in parallel with one another in a predetermined direction, and first connecting portions 612_1 connecting the first stripes 611_1. The second sub-pixel electrode 620_1 includes second stripes 621_1 extending in parallel with the first stripes 611_1, and second connecting portions 622_1 connecting the second stripes 621_1. That is to say, the first sub-pixel electrode 610_1 and the second sub-pixel electrode 620_1 alternate with each other with a predetermined gap and are electrically separated from each other.

In particular, in an exemplary embodiment of the present invention, the second sub-pixel electrode 620_1 overlaps the first and second data lines DAi and DBi. In detail, the second sub-pixel electrode 620_1 is formed along the second data line DBi, a previous gate line (not shown) and the first data line DAi and may overlap the first and second data lines DAi and DBi, as shown in FIG. 6A.

While FIG. 6A shows that the second sub-pixel electrode 620_1 fully overlaps the first and second data lines DAi and DBi, other embodiments of the invention are not limited thereto. In a modified embodiment, as shown in FIG. 7, the second sub-pixel electrode 620_2 may partially overlap the first and second data lines DAi and DBi. The first and second sub-pixel electrodes 610_2 and 620_2 according to the modified embodiment shown in FIG. 7 are substantially the same with the first and second sub-pixel electrodes 610_1 and 620_1 shown in FIG. 4, except that the second sub-pixel electrode 620_2 partially overlaps the first and second data lines DAi and DBi. Therefore, as shown in FIG. 2, the first parasitic capacitor Cdp1 exists between the second sub-pixel electrode 620_1 and the first data line DAi and the second parasitic capacitor Cdp2 exists between the second sub-pixel electrode 620_1 and the second data line DBi.

Here, the overlap area of the second sub-pixel electrode 620_1 and the first data line DAi may be substantially the same as the overlap area of the second sub-pixel electrode 620_1 and the second data line DBi. That is to say, the overlap area of the second sub-pixel electrode 620_1 and the first data line DAi is substantially the same as the overlap area of the second sub-pixel electrode 620_1 and the second data line DBi such that capacitance of the first parasitic capacitor Cdp1 may be substantially the same as the capacitance of the second parasitic capacitor Cdp2.

As shown in FIG. 6B, the first sub-pixel electrode 610_1 is separated from the first and second data lines DAi and DBi. In detail, the first sub-pixel electrode 610_1 is spaced a predetermined gap apart from the second sub-pixel electrode 620_1 overlapping the first and second data lines DAi and DBi, and is separated from the first and second data lines DAi and DBi. Accordingly, unlike the case of the second sub-pixel electrode 620_1, substantially or no parasitic capacitance exists between the first sub-pixel electrodes 610_1 and the first and second data lines DAi and DBi.

Therefore, in a display panel according to an exemplary embodiment of the invention, data voltages of the first and second sub-pixel electrodes 610_1 and 620_1 may not substantially change even if the polarities of the first and second data voltages applied to the first and second data lines DAi and DBi are changed. Accordingly, the display panel can provide an image with improved picture quality.

In a display panel according to a further embodiment of the invention, a pixel electrode, specifically a second sub-pixel electrode, including first and second sub-pixel electrodes 610_1 and 620_1 is formed to overlap the first and second data lines DAi and DBi, thereby improving the aperture ratio of the display panel.

An alignment layer (not shown) capable of aligning the liquid crystal layer may be disposed on the first and second sub-pixel electrodes 610_1 and 620_1 and on the passivation layer 570.

Hereinafter, an upper display panel according to an exemplary embodiment of the present invention will be described in detail. The upper display panel (not shown) is disposed to face the lower display panel, and includes an insulation substrate (not shown), a black matrix (not shown), color filters (not shown), and so on.

In detail, a black matrix for preventing light leakage and defining a pixel region is formed on an insulating substrate such as transparent glass. The black matrix may be formed at portions corresponding to the gate line Gj and the first and second data lines DAi and DBi and switching devices. The black matrix may be formed of chromium or a chromium-based metallic material such as chromium oxide, or an organic black resist. Red, green and blue color filters (not shown) may be sequentially arranged in pixel areas between neighboring black matrixes.

An overcoat layer for planarizing step heights of the color filters may be formed on the color filters and an alignment layer for aligning the liquid crystal molecules may be coated on the overcoat layer.

A liquid crystal layer is disposed between the lower display panel and the upper display panel. The liquid crystal molecules contained in the liquid crystal layer are aligned such that their long axes are substantially parallel to surfaces of the upper and lower panels in absence of electric field, and have positive dielectric anisotropy. Accordingly, if a horizontal electric field is formed between sub-pixel electrodes, the liquid crystal molecules tend to change their orientations in response to the electric field such that their long axes are parallel to the direction of the electric field direction.

Figure 8:
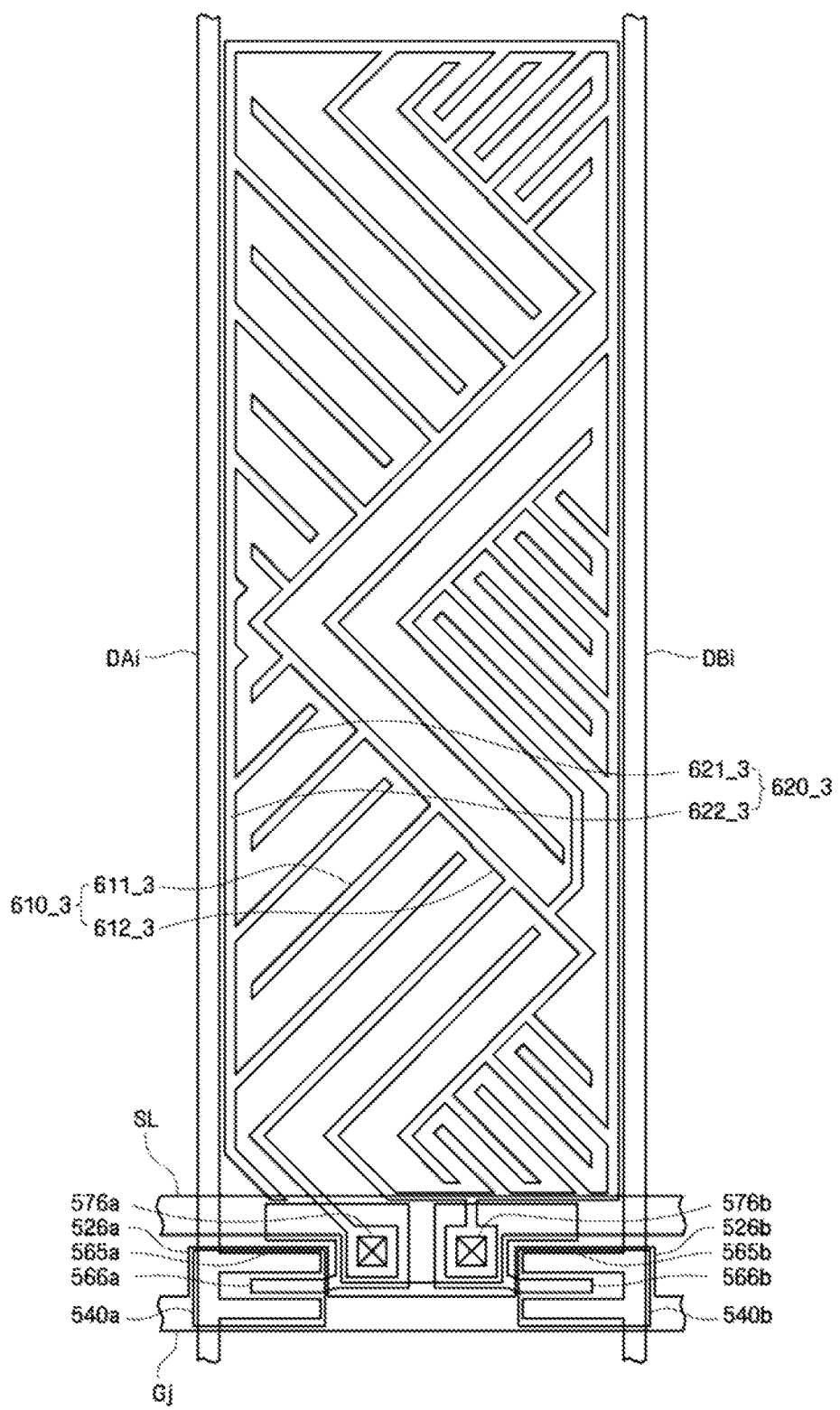
FIG. 8 illustrates a layout view of a display panel including a lower display panel according to another exemplary embodiment of the present invention.

FIG. 8 illustrates a layout view of a display panel including a lower display panel according to another exemplary embodiment of the present invention. For the convenience of explanation, components having the same function as described in the embodiment shown in FIGS. 4 through 7 are respectively identified by the same or similar reference numerals, and their repetitive description will be omitted. Thus, the following description will be focused on differences.

Referring to FIGS. 4 and 8, a lower display panel according to another exemplary embodiment of the present invention is substantially the same as the display panel according to the exemplary embodiment of FIG. 4 except that a second sub-pixel electrode 620_3 is not overlapped with first and second data lines DAi and DBi.

In detail, in a display panel according to another exemplary embodiment of the present invention, the second sub-pixel electrode 620_3 is formed along the second data line DBi, a previous gate line (not shown) and the first data line DAi, but is not overlapped with the first and second data lines DAi and DBi. That is to say, as shown in FIG. 8, the second sub-pixel electrode 620_3 may be formed to be adjacent with the first and second data lines DAi and DBi.

Here, a first parasitic capacitor is formed by the second sub-pixel electrode 620_3, the first data line DAi and a dielectric material interposed therebetween, and a second parasitic capacitor is formed by the second sub-pixel electrode 620_3, the second data line DBi and a dielectric material interposed therebetween. Since the second sub-pixel electrode 620_3 is not overlapped with the first and second data lines DAi and DBi, capacitances of the first and second parasitic capacitors formed in the embodiment shown in FIG. 8 may be smaller than those of the first and second parasitic capacitors Cdp1 and Cdp2 formed in the embodiment shown in FIG. 4.

In addition, since the first sub-pixel electrode 610_3 is separated from the first and second data lines DAi and DBi, substantially or no parasitic capacitance exists between the first sub-pixel electrode 610_3 and the first and second data lines DAi and DBi.

Therefore, as in the embodiment shown in FIG. 4, in the embodiment shown in FIG. 8, pixel voltages charged between the first and second sub-pixel electrodes 610_3 and 620_3 may not substantially change even if polarities of the first and second data voltages applied to the first and second data lines DAi and DBi are changed.

Figure 9:
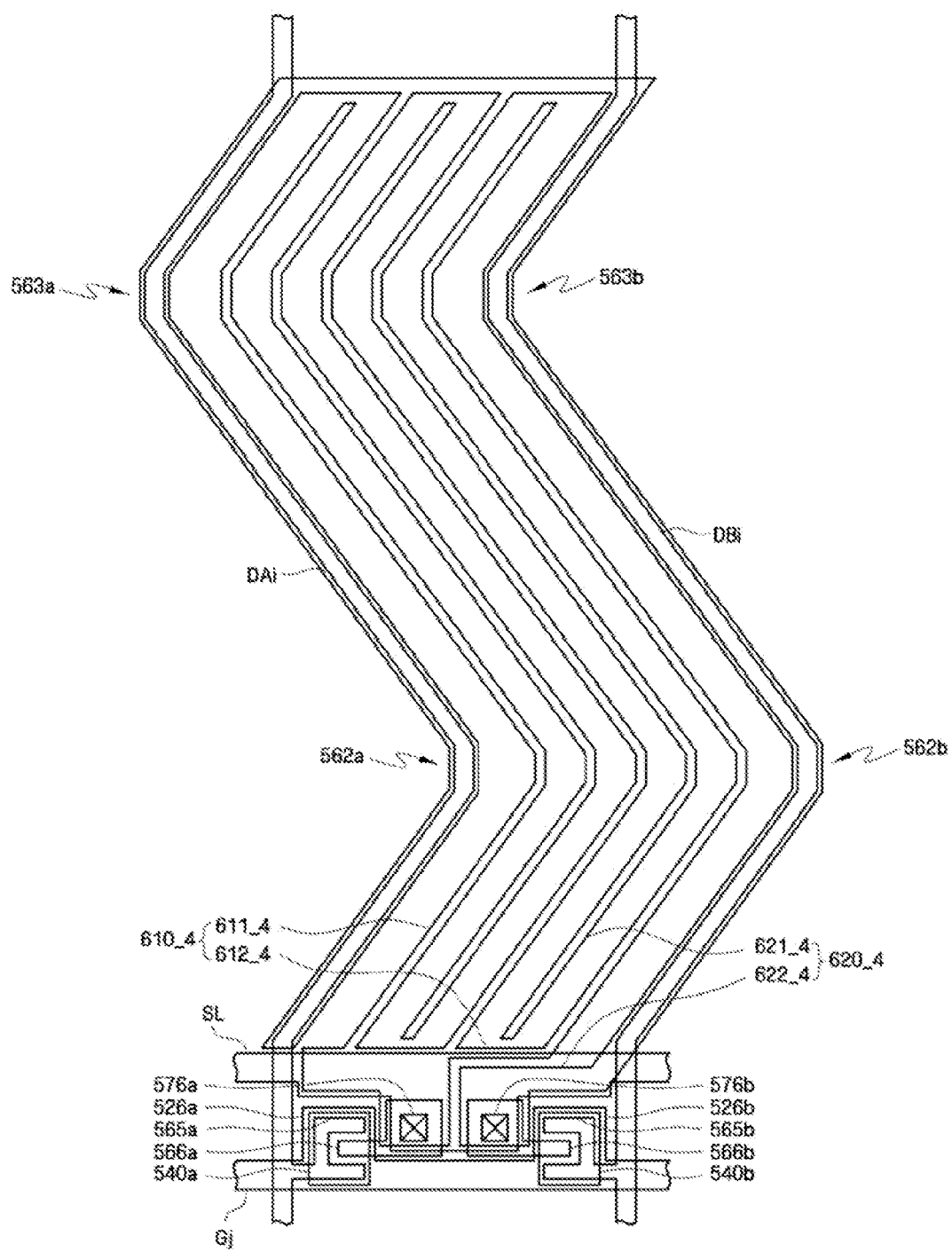
FIG. 9 illustrates a layout view of a display panel including a lower display panel according to another exemplary embodiment of the present invention.

FIG. 9 illustrates a layout view of a display panel including a lower display panel according to another exemplary embodiment of the present invention. For the convenience of explanation, components having the same function as described in the embodiments of FIGS. 4 to 8 are respectively identified by the same or similar reference numerals, and their repetitive description will be omitted. Thus, the following description will be focused on differences.

Referring to FIGS. 4 and 9, a display panel according to another exemplary embodiment of the present invention is substantially the same as the display panel according to the embodiments of FIGS. 4 to 8 except that the first and second data lines DAi and DBi include bent portions 562a, 562b, 563a, and 563b.

In detail, the first and second data lines DAi and DBi do not extend in a longitudinal direction, and include one or more bent portions 562a, 562b, 563a, and 563b. In detail, the first and second data lines DAi and DBi may include first bent portions 562a and 562b bent from a first direction to a second direction, and second bent portions 563a and 563b bent from the second direction to the first direction.

The first and second sub-pixel electrodes 610_4 and 620_4 alternate with each other by a predetermined gap therebetween, and a horizontal electric field is formed using data voltages transmitted from the first and second data lines DAi and DBi. The first sub-pixel electrode 610_4 includes first stripes 611_4 extending in parallel with one another in a predetermined direction, and first connecting portions 612_4 connecting the first stripes 611_4. The second sub-pixel electrode 620_4 includes second stripes 621_4 extending in parallel with the first stripes 611_4, and second connecting portions 622_4 connecting the second stripes 621_4.

In particular, the second sub-pixel electrode 620_4 is formed along a previous gate line (not shown) and the first and second data lines DAi and DBi having the bent portions 562a, 562b, 563a, and 563b. While FIG. 9 shows that the second sub-pixel electrode 620_4 fully overlaps the first and second data lines DAi and DBi, other embodiments of the invention are not limited thereto. In the embodiment shown in FIG. 9, the second sub-pixel electrode 620_4 may partially overlap the first and second data lines DAi and DBi. In further exemplary embodiments, the second sub-pixel electrode 620_4 may also be formed to be adjacent with the first and second data lines DAi and DBi.

Figure 10:
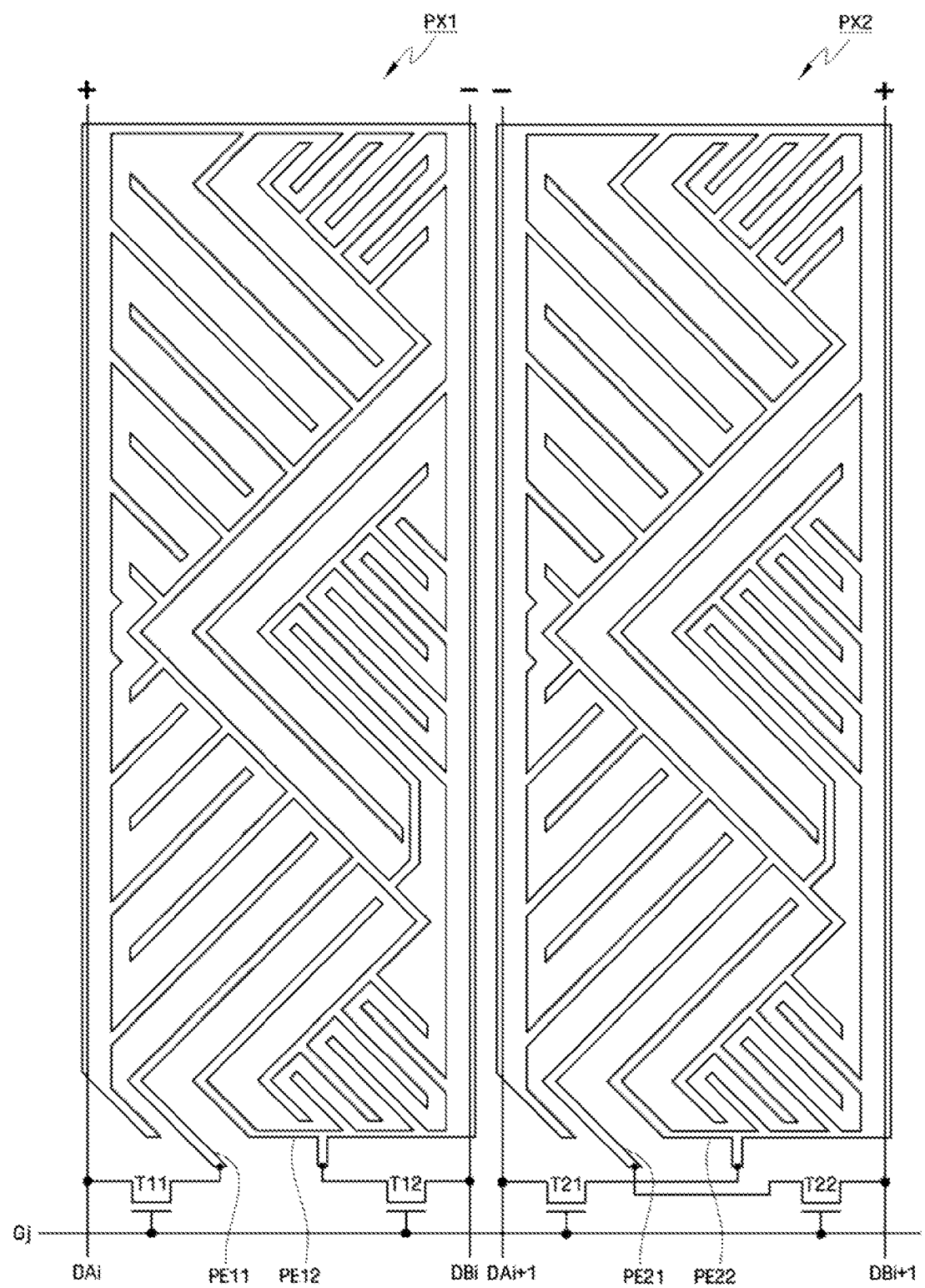
FIG. 10 illustrates a layout view of a display panel including a lower display panel according to another exemplary embodiment of the present invention.

FIG. 10 illustrates a layout view of a display panel including a lower display panel according to another exemplary embodiment of the present invention. For the convenience of explanation, components having the same function as described in the embodiments of FIGS. 4 to 9 are respectively identified by the same or similar reference numerals, and their repetitive description will be omitted. Thus, the following description will be focused on differences between the previous and current embodiments.

For brevity, the illustration of FIG. 10 is focused on first and second data lines and first and second sub-pixel electrodes, and the switching devices are illustrated.

Referring to FIG. 10, the display panel according to the current embodiment of the present invention includes a first pixel PX1 and a second pixel PX2 adjacent to the first pixel PX1 in a direction of gate lines (e.g., in a horizontal direction). Each of the pixels PX1 and PX2 includes first and second data lines DAi and DBi, DAi+1 and DBi+1, first and second sub-pixel electrodes PE11 and PE12, PE21 and PE22, first and second switching devices T11 and T12, T21 and T22, and a gate line Gj, respectively.

The first data lines DAi and DAi+1 of the respective pixels PX1 and PX2 receive a first data voltage, and polarities of the first data voltage alternately change between positive polarity and negative polarity for every first data line of each pixel, e.g., DAi and DAi+1. By contrast, the second data lines DBi and DBi+1 receive a second data voltage, and polarities of the second data voltage alternately change between negative polarity and positive polarity for every second data line of each pixel, e.g., DBi and DBi+1. In addition, polarities of the first data voltage applied to the first data lines DAi and DAi+1 of the respective pixels PX may be different from those of the second data voltage applied to the second data lines data lines DBi and DBi+1.

For example, if a first data voltage of positive polarity is applied to the first data line DAi of the first pixel PX1 and a second data voltage of negative polarity is applied to the second data line DBi of the first pixel PX1, a first data voltage of negative polarity is applied to the first data line DAi+1 of the second pixel PX2 adjacent to the first pixel PX1 and a second data voltage of positive polarity is applied to the second data line DBi+1 of the second pixel PX2.

Similarly, if a first data voltage of negative polarity is applied to the first data line DAi of the first pixel PX1 and a second data voltage of positive polarity is applied to the second data line DBi of the first pixel PX1, a first data voltage of positive polarity is applied to the first data line DAi+1 of the second pixel PX2 adjacent to the first pixel PX1 and a second data voltage of negative polarity is applied to the second data line DBi+1 of the second pixel PX2.

Therefore, since a data voltage of the same polarity is applied to adjacent data lines, e.g., DBi and DAi+1, the adjacent data lines DBi and DAi+1 may be less affected by coupling.

The first pixel PX1 includes first and second sub-pixel electrodes PE11 and PE12. The first and second sub-pixel electrodes PE11 and PE12 alternate with each other with a predetermined gap therebetween, and a horizontal electric field is formed using data voltages transmitted from the first and second data lines DAi and DBi. In detail, the first sub-pixel electrode PE11 is connected to the first data line DAi through the first switching device T11, and the second sub-pixel electrode PE12 is connected to the second data line DBi through the second switching device T12, thereby forming the horizontal electric field using the data voltages transmitted from the first and second data lines DAi and DBi.

The first sub-pixel electrode PE11 includes first stripes extending in parallel with one another in a predetermined direction, and first connecting portions connecting the first stripes. The second sub-pixel electrode PE12 includes second stripes extending in parallel with the first stripes, and second connecting portions connecting the second stripes.

In particular, the second sub-pixel electrode PE12 overlaps the first and second data lines DAi and DBi. In detail, the second sub-pixel electrode PE12 is formed along the second data line DBi, a previous gate line (not shown) and the first data line DAi and may overlap the first and second data lines DAi and DBi, as shown in FIG. 10. On the other hand, unlike the second sub-pixel electrode PE12, the first sub-pixel electrode PE11 may be separated from the first and second data lines DAi and DBi.

Accordingly, as described above, sine there is substantially or no separate parasitic capacitance existing between the first sub-pixel electrode PE11 and the first and second data lines DAi and DBi, the first sub-pixel electrode PE11 may not be affected by the data voltages applied to the first and second data lines DAi and DBi. In addition, since first and second parasitic capacitors are disposed between the second sub-pixel electrode PE12 and the first and second data lines DAi and DBi, a voltage variation of the second sub-pixel electrode PE12 based on the first parasitic capacitor may be substantially the same as a voltage variation of the second sub-pixel electrode PE12 based on the second parasitic capacitor while having different polarities. That is to say, the second sub-pixel electrode PE12 may not be substantially affected by the data voltages applied to the first and second data lines DAi and DBi.

The second pixel PX2 includes first and second sub-pixel electrodes PE21 and PE22. The first and second sub-pixel electrodes PE21 and PE22 alternate with each other with a predetermined gap, and a horizontal electric field is formed using data voltages transmitted from the first and second data lines DAi+1, DBi+1. Here, the first and second sub-pixel electrodes PE21 and PE22 of the second pixel PX2 are substantially the same with the first and second sub-pixel electrodes PE11 and PE12 of the first pixel PX1. That is to say, the first sub-pixel electrode PE21 may be separated from the first and second data lines DAi+1 and DBi+1, and the second sub-pixel electrode PE22 may overlap the first and second data lines DAi+1 and DBi+1.

However, unlike the first sub-pixel electrode PE11 of the first pixel PX1, the first sub-pixel electrode PE21 of the second pixel PX2 may be connected to the second data line DBi+1 through the second switching device T22. Furthermore, unlike the second sub-pixel electrode PE12 of the first pixel PX1, the second sub-pixel electrode PE22 is connected to the first data line Dai+1 through the first switching device T21.

Accordingly, if a data voltage of positive polarity is applied to the first sub-pixel electrode PE11 of the first pixel PX1 and a data voltage of negative polarity is applied to the second sub-pixel electrode PE12 of the first pixel PX1, a data voltage of positive polarity is applied to the second sub-pixel electrode PE22 of the second pixel PX2 and a data voltage of negative polarity is applied to the first sub-pixel electrode PE21 of the second pixel PX2. That is to say, in the first and second pixels PX1 and PX2 adjacent to each other, a data voltage of the same polarity may be applied to the second sub-pixel electrodes PE12 and PE22 overlapping the first and second data lines DAi and DBi, DAi+1 and DBi+1. Accordingly, even if the second sub-pixel electrodes PE12 and PE22 overlap the first and second data lines DAi and DBi, DAi+1, DBi+1, and the second sub-pixel electrode PE12 of the first pixel PX1 is formed to be adjacent to the second sub-pixel electrode PE22 of the second pixel PX2, the second sub-pixel electrode PE12 of the first pixel PX1 and the second sub-pixel electrode PE22 of the second pixel PX2 will be less affected by coupling therebetween.

While embodiments of the present invention have been particularly shown and described with reference to exemplary embodiments thereof, it will be understood by those of ordinary skill in the art that various changes in form and details may be made therein without departing from the spirit and scope of the embodiments of present invention as defined by the following claims. It is therefore desired that the present embodiments be considered in all respects as illustrative and not restrictive, reference being made to the appended claims rather than the foregoing description to indicate the scope of the invention.

What is claimed is:
1. A display panel comprising:
a plurality of gate lines disposed on a substrate that extend in a first direction;
a plurality of first data lines that extend in a second direction, crossing the plurality of gate lines and transmitting a first data voltage;
a plurality of second data lines parallel with the plurality of first data lines and transmitting a second data voltage; and
a plurality of pixels defined by the plurality of gate lines and the plurality of first data lines, each of the plurality of pixels including first and second sub-pixel electrodes alternating with each other to form a horizontal electric field,
wherein the second sub-pixel electrode is formed along the first and second data lines and the gate line of a previous first sub-pixel electrode,
wherein the second sub-pixel electrode overlaps the first and second data lines without crossing the first and second data lines,
wherein the first sub-pixel electrode does not overlap the first and second data lines and the second sub-pixel electrode, wherein an overlap area between the second sub-pixel electrode and the first data line is the same as that between the second sub-pixel electrode and the second data line, wherein the first sub-pixel electrode includes first stripes that extend in a third direction, first stripes that extend in a fourth direction, and a first connecting portion that connects the first stripes extending in the third direction and the first stripes extending in the fourth direction, and wherein the second sub-pixel electrode includes second stripes that extend in the third direction, second stripes that extend in the fourth direction, and a second connecting portion that connects the second stripes extending in the third direction and the second stripes extending in the fourth direction, and wherein the third direction is different from the first direction, the second direction and the fourth direction.

2. The display panel of claim 1, wherein an absolute value of the first data voltage is the same as that of the second data voltage, the first data voltage has a first polarity, and the second data voltage has a second polarity different from the first polarity.

3. The display panel of claim 2, wherein the first data voltage has polarities repeatedly alternating between the first polarity and the second polarity different from the first polarity for every first data line of each pixel, the second data voltage has polarities repeatedly alternating between the second polarity and the first polarity for every second data line of each pixel, and when the first data voltage applied to the first data line of each pixel has the first polarity, the second data voltage applied to the second data line has the second polarity.

4. The display panel of claim 1, wherein the plurality of pixels includes a first pixel and a second pixel adjacent to each other in a direction of the gate lines, the second sub-pixel electrode of the first pixel is connected to the first data line of the first pixel, and the second sub-pixel electrode of the second pixel is connected to the second data line of the second pixel.

5. The display panel of claim 1, further comprising a first parasitic capacitor between each of the second sub-pixel electrodes and each of the first data lines, a second parasitic capacitor between each of the second sub-pixel electrodes and each of the second data lines, wherein a capacitance of the first parasitic capacitor is the same as that of the second parasitic capacitor.

6. A display panel comprising:

a gate line that extends in the first direction and transmitting a gate voltage;

first and second sub-pixel electrodes alternating with each other to form a horizontal electric field, a first switching device selectively connecting the first sub-pixel electrode and a first data line according to the gate voltage;

a second switching device selectively connecting the second sub-pixel electrode and a second data line according to the gate voltage; and a liquid crystal capacitor formed between the first and second sub-pixel electrodes, wherein the first data line and the second data lines extend in a second direction, wherein when the first and second switching devices are turned off and polarities of first and second data voltages applied to the first and second data lines are changed, there is no voltage variation between the first and second sub-pixel electrodes, wherein the second sub-pixel electrode overlaps the first and second data lines without crossing the first and second data lines, wherein the first sub-pixel electrode does not overlap the first and second data lines and the second sub-pixel electrode, and wherein an overlap area between the second sub-pixel electrode and the first data line is the same as that between the second sub-pixel electrode and the second data line, wherein the first sub-pixel electrode includes first stripes that extend in a third direction, first stripes that extend in a fourth direction, and a first connection portion that connects the first stripes extend ing in the third direction and the first stripes extending in the fourth direction, and wherein the second sub-pixel electrode includes second stripes that extend in the third direction, second stripes that extend in the fourth direction, and a second connecting portion that connects the second stripes extending in the third direction and the second stripes extending in the fourth direction, and wherein the third direction is different from the first direction, the second direction and the fourth direction.

7. The display panel of claim 6, further comprising a first parasitic capacitor between each of the second sub-pixel electrodes and each of the first data lines, a second parasitic capacitor between each of the second sub-pixel electrodes and each of the second data lines, wherein a capacitance of the first parasitic capacitor is the same as that of a second parasitic capacitor.

8. The display panel of claim 6, wherein the first sub-pixel electrode includes first stripes, and first connecting portions connecting the first stripes, and the second sub-pixel electrode includes second stripes parallel with the first stripes, and second connecting portions connecting the second stripes.

9. The display panel of claim 8, wherein the second connecting portions partially overlap the first and second data lines along the first and second data lines.

10. The display panel of claim 6, wherein an absolute value of the first data voltage is the same as that of the second data voltage, the first data voltage has a first polarity, and the second data voltage has a second polarity different from the first polarity.

\* \* \* \* \*